(12) United States Patent
Cheng et al.

(10) Patent No.: US 10,944,584 B1
(45) Date of Patent: *Mar. 9, 2021

(54) SINGLE-ENDED SIGNALING BETWEEN DIFFERENTIAL ETHERNET INTERFACES

(71) Applicant: CREDO TECHNOLOGY GROUP LIMITED, Grand Cayman (KY)

(72) Inventors: Lawrence Chi Fung Cheng, Palo Alto, CA (US); Rajan Pai, San Jose, CA (US)

(73) Assignee: CREDO TECHNOLOGY GROUP LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/678,790

(22) Filed: Nov. 8, 2019

Related U.S. Application Data

(60) Provisional application No. 62/914,198, filed on Oct. 11, 2019.

(51) Int. Cl.
*H04L 5/16* (2006.01)
*H04L 12/28* (2006.01)
(Continued)

(52) U.S. Cl.
CPC .... *H04L 12/2801* (2013.01); *H04L 25/03885* (2013.01); *H04L 25/4917* (2013.01)

(58) Field of Classification Search
CPC ........... H04L 12/2801; H04L 25/03885; H04L 25/4917
(Continued)

(56) References Cited

U.S. PATENT DOCUMENTS

| 7,049,937 B1 * | 5/2006 | Zweig ................ H01R 13/641 |
| | | 324/66 |
| 7,401,985 B2 | 7/2008 | Aronson et al. |

(Continued)

FOREIGN PATENT DOCUMENTS

| CN | 1941649 A | 4/2007 |
| WO | 2018161273 A1 | 9/2018 |

OTHER PUBLICATIONS

Restriction Requirement/Election Action dated May 1, 2020 for U.S. Appl. No. 16/541,094.
(Continued)

*Primary Examiner* — Helene E Tayong
(74) *Attorney, Agent, or Firm* — Ramey & Schwaller LLP; Daniel J. Krueger

(57) ABSTRACT

Mass-manufactured cables suitable for large communication centers may convert from differential PAM4 interface signaling to parallel single-ended NRZ transit signaling at 53.125 GBd to provide bidirectional data rates up to 800 Gbps and beyond. One illustrative cable embodiment includes: electrical conductors connected between a first connector and a second connector, each adapted to fit into an Ethernet port of a corresponding host device to receive an electrical input signal to the cable conveying an outbound data stream from the host device and to provide an electrical output signal from the cable conveying an inbound data stream to that host device. The electrical input and output signals employ differential PAM4 modulation to convey the inbound and outbound data streams. Each of the first and second connectors includes transceivers to perform clock and data recovery on the electrical input signal to extract and re-modulate the outbound data stream for transit via the electrical conductors as respective pairs of electrical transit signals employing single-ended NRZ modulation.

19 Claims, 6 Drawing Sheets

(51) Int. Cl.
*H04L 25/03* (2006.01)
*H04L 25/49* (2006.01)

(58) Field of Classification Search
USPC .......................................................... 375/220
See application file for complete search history.

(56) References Cited

U.S. PATENT DOCUMENTS

| | | | |
|---|---|---|---|
| 9,230,416 B2 | 1/2016 | Ward et al. | |
| 9,322,704 B1 | 4/2016 | Neveux | |
| 9,337,993 B1* | 5/2016 | Lugthart | ................ H04L 7/0054 |
| 9,438,338 B1* | 9/2016 | Chan | ...................... H04B 10/11 |
| 2004/0103441 A1* | 5/2004 | Williams | ........... H04N 21/2381 |
| | | | 725/121 |
| 2013/0343400 A1 | 12/2013 | Lusted et al. | |
| 2014/0086264 A1 | 3/2014 | Lusted et al. | |
| 2014/0146833 A1 | 5/2014 | Lusted et al. | |
| 2014/0182124 A1* | 7/2014 | Louderback | ......... G02B 6/4416 |
| | | | 29/825 |
| 2016/0197434 A1* | 7/2016 | Lett | ..................... H01R 13/516 |
| | | | 348/373 |
| 2017/0170927 A1* | 6/2017 | Stone | .................... H04L 1/0042 |
| 2018/0241579 A1 | 8/2018 | Lin et al. | |

OTHER PUBLICATIONS

Rumer, B. (Feb. 1, 2001). Fighting Jitter in Fibre-Channel Designs. EE Times. Retrieved Jan. 23, 2019, from https://www.eetimes.com/document.aspdoc_id=1277249#.

Management Data Input/Output. (Nov. 25, 2018). Wikiepedia. Retrieved Jan. 23, 2019, from https://en.wikipedia.org/wiki/Management_Data_Input/Output.

QSFP-DD MSA-QSFP-DD Hardware Specification for QSFP Double Density 8X Pluggable Transceiver Rev 4.0 Candidate. Aug. 15, 2018.

40 Gigabit Ethernet, 40G QSFP+, 40GBASE-LR4, 40G-BASE-SR4, CFP module, CXP Transceiver, MPO MTP Fiber on May 25, 2015 [http://www.cables-solutions.com/guide-to-40-gigabit-ethernet-options.html].

IEEE P802.3cd/D1.2, Feb. 3, 2017 (Amendment of IEEE Std 802.3-2015 as amended) IEEE Draft Standard for Ethernet Amendment: Media Access Control Parameters for 50 Gb/s, 100 Gb/s and 200 Gb/s Operation.

International Search Report and Written Opinion dated Dec. 6, 2017 for Application No. PCT/CN2017/075961 filed Mar. 8, 2017.

Optical Internetworking Forum Contribution OIF2014.277.11 "CEI-56G-VSR-NRZ Very Short Reach Interface" Mar. 1, 2019.

* cited by examiner

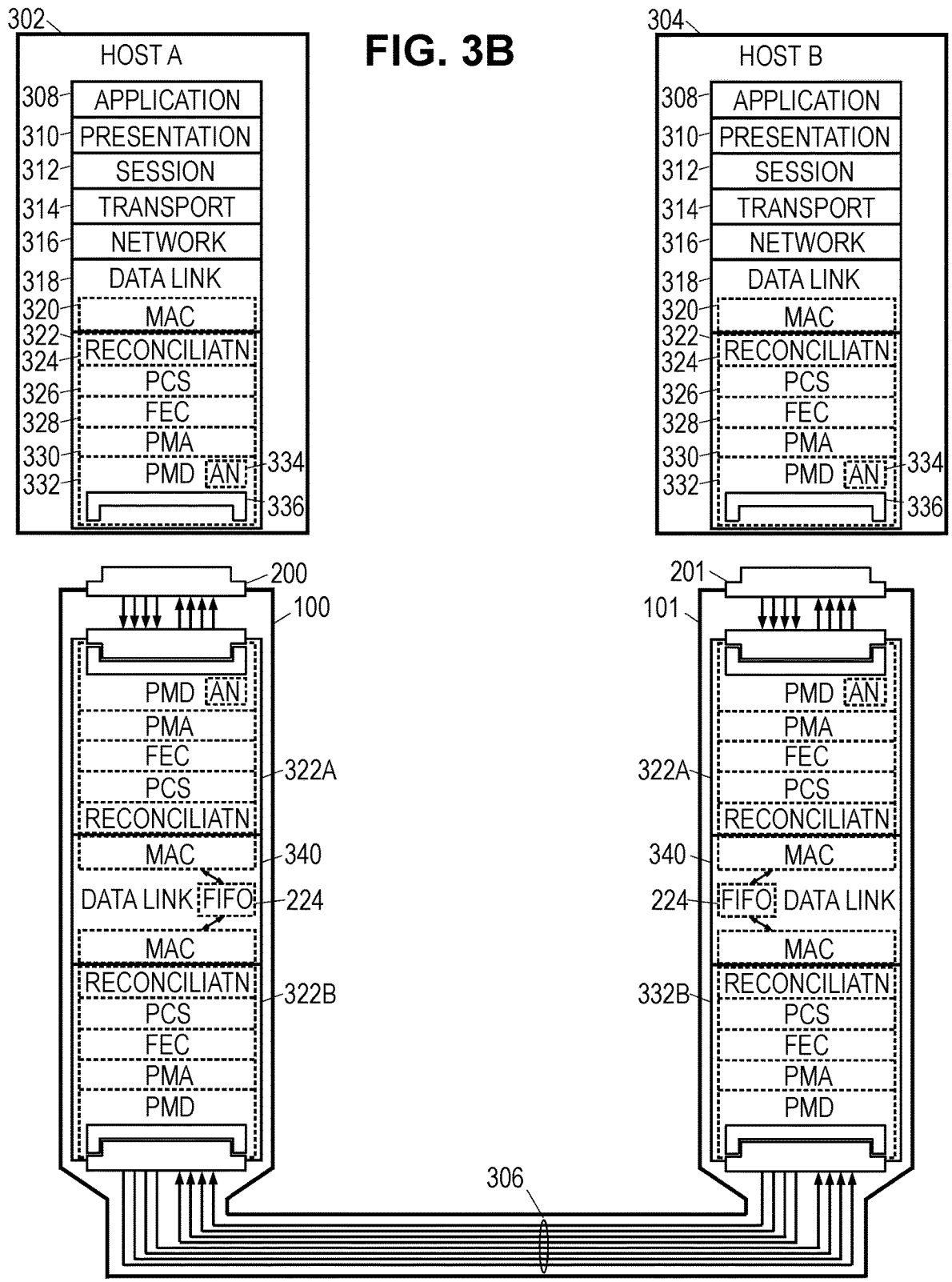

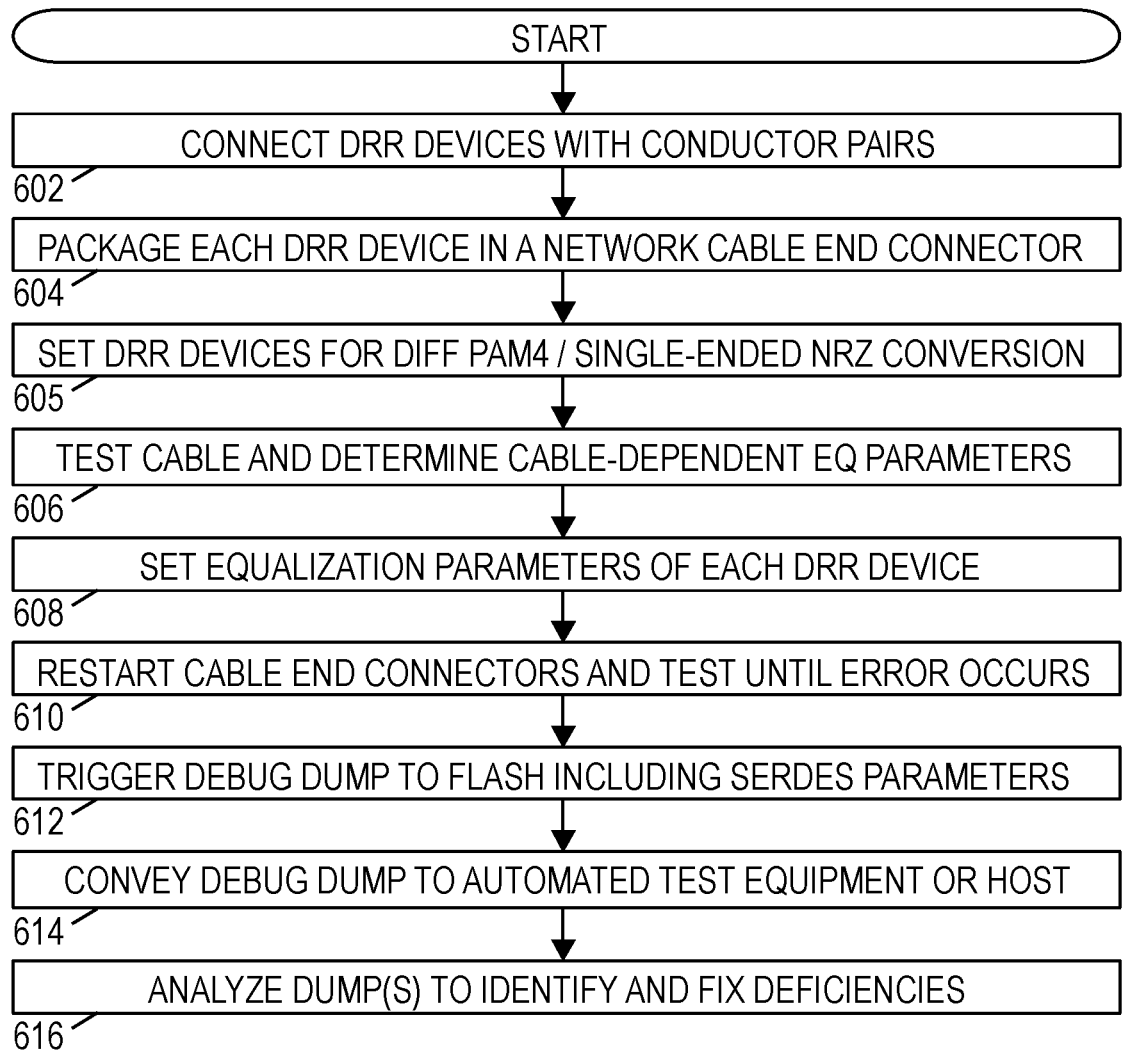

SINGLE-ENDED SIGNALING BETWEEN DIFFERENTIAL ETHERNET INTERFACES

BACKGROUND

The Institute of Electrical and Electronics Engineers (IEEE) Standards Association publishes an IEEE Standard for Ethernet, IEEE Std 802.3-2015, which will be familiar to those of ordinary skill in the art to which this application pertains. This Ethernet standard provides a common media access control specification for local area network (LAN) operations at selected speeds from 1 Mb/s to 100 Gb/s over coaxial cable, twinaxial cable, twisted wire pair cable, fiber optic cable, and electrical backplanes, with various channel signal constellations. As demand continues for ever-higher data rates, the standard is being extended. Such extensions to the standard must account for increased channel attenuation and dispersion even as the equalizers are forced to operate at faster symbol rates. It is becoming increasingly difficult to provide affordable, mass-manufactured network hardware that assures consistently robust performance as the proposed per-lane bit rates rise beyond 50 Gbps with PAM4 or larger signal constellations.

One proposed cable design supports a data rate of 400 Gbps in each direction, but requires at least 32 electrical conductors to do so. The electrical conductors form 16 differential signaling pairs, eight in each direction. Each differential signaling pair may employ PAM4 signaling at 25 GBaud to convey 50 Gbps. As current transceiver technology is unable to support PAM4 signaling at 50 GBaud over electrical cable conductors, it would seem that the only way to double the cable's supported data rates is to double the number of electrical conductors in the cable. However, a cable having 64 or more electrical conductors becomes infeasibly bulky, inflexible, expensive, and/or unsuitable for use in a large communications center.

SUMMARY

Accordingly, there are disclosed herein architectures and communication methods that enable mass-manufactured cables suitable for large communication centers to perform robustly at bidirectional data rates up to 800 Gbps and beyond. One illustrative cable embodiment includes: electrical conductors connected between a first connector and a second connector, each of the first and second connectors being adapted to fit into an Ethernet port of a corresponding host device to receive an electrical input signal to the cable conveying an outbound data stream from the host device and to provide an electrical output signal from the cable conveying an inbound data stream to that host device, said electrical input and output signals employing differential PAM4 modulation to convey the inbound and outbound data streams. Each of the first and second connectors include a respective transceiver that performs clock and data recovery on the electrical input signal to extract and re-modulate the outbound data stream for transit via the electrical conductors as respective pairs of electrical transit signal conveying a transit data stream, each of said electrical transit signals employing single-ended NRZ modulation to convey the transit data streams.

One illustrative embodiment of a communication method includes, in a network cable having electrical conductors connecting a first connector to a second connector: (a) receiving with the first connector a first electrical input signal using differential PAM4 modulation to convey a first outbound data stream from a first host device; (b) performing clock and data recovery on the first electrical input signal with a first transceiver in the first connector to extract the first outbound data stream; (c) re-modulating the first outbound data stream as a first pair of electrical transit signals using single-ended NRZ modulation to convey a first transit data stream; (d) receiving with the second connector a second electrical input signal using differential PAM4 modulation to convey a second outbound data stream from a second host device; (e) performing clock and data recovery on the second electrical input signal with a second transceiver in the second connector to extract the second outbound data stream; and (f) re-modulating the second outbound data stream as a second pair of electrical transit signals using single-ended NRZ modulation to convey a second transit data stream.

One illustrative embodiment of a cable manufacturing method includes: (a) connecting a first end and a second end of a set of conductors to a first transceiver and a second transceiver, respectively, to transport a first pair of electrical transit signals from the first transceiver to the second transceiver and a second pair of electrical transit signals from the second transceiver to the first transceiver, the first and second pairs of electrical transit signals each using single-ended NRZ modulation to convey data; (b) packaging the first transceiver into a first connector configured to couple a first electrical input signal from a network interface port of a first host device to the first transceiver and a first electrical output signal from the first transceiver to the network interface port of the first host device, the first electrical input and output signals each using differential PAM4 modulation to convey data; and (c) packaging the second transceiver into a second connector configured to couple a second electrical input signal from a network interface port of a second host device to the second transceiver and a second electrical output signal from the second transceiver to the network interface port of the second host device, the second electrical input and output signals each using differential PAM4 modulation to convey data. The first and second transceivers perform clock and data recovery on the first and second electrical input signal to extract and re-modulate the first and second outbound data streams respectively as the first and second pairs of electrical transit signals conveying first and second transit data streams.

Each of the foregoing embodiments may be implemented individually or in combination, and may be implemented with one or more of the following features in any suitable combination: 1. the respective transceiver for each of the first and second connectors performs clock and data recovery on the respective pair of electrical transit signals to extract and re-modulate the transit data stream as the inbound data stream to the host device, each of the respective transceivers employing fixed, cable-independent, equalization parameters for each of: the remodulation of the transit data stream as the inbound data stream, and the clock and data recovery performed on the electrical input signal. 2. the respective transceivers each employ cable-dependent equalization parameters for at least one of: the remodulation of the outbound data stream for transit, and the clock and data recovery performed on the electrical transit signal. 3. said cable-dependent equalization parameters adapt during usage of the Ethernet cable. 4. said cable-dependent equalization parameters are fixed during normal usage of the Ethernet cable. 5. said cable-dependent equalization parameters are determined during manufacturer-testing of the Ethernet cable. 6. the inbound data stream and the outbound data stream each have a per-lane symbol rate in excess of 50 GBd, while each said electrical conductor conveys NRZ bit symbols at a rate in excess of 50 Gbps. 7. the electrical conductors convey 16 electrical transit signals from the first connector to the second connector and another 16 electrical transit signals from the second connector to the first connector, thereby conveying data in each direction at a rate in excess of 800 Gbps. 8. (g) performing clock and data recovery on the first pair of electrical transit signals with the second transceiver to extract the first transit data stream; (h) re-modulating the first transit data stream as a second electrical output signal using differential PAM4 modulation to convey a second inbound data stream to the second host device; (i) performing clock and data recovery on the second pair of electrical transit signals with the first transceiver to extract the second transit data stream; and (j) re-modulating the second transit data stream as a first electrical output signal using differential PAM4 modulation to convey a first inbound data stream to the first host device. 9. said re-modulating the first transit data stream, said re-modulating the second transit data stream, said performing clock and data recovery on the first electrical input signal, and said performing clock and data recovery on the second electrical input signal, each employ fixed, cable-independent, equalization parameters. 10. cable-dependent equalization parameters are employed for at least one of: re-modulating the first outbound data stream, re-modulating the second outbound data stream, said performing clock and data recovery on the first electrical transit signal, and said performing clock and data recovery on the second electrical transit signal.

BRIEF DESCRIPTION OF THE DRAWINGS

FIG. 3B is an architectural diagram for a communications link including the illustrative cable.

FIG. 6 is a flow diagram of an illustrative cable manufacturing method.

DETAILED DESCRIPTION

Figure 1:
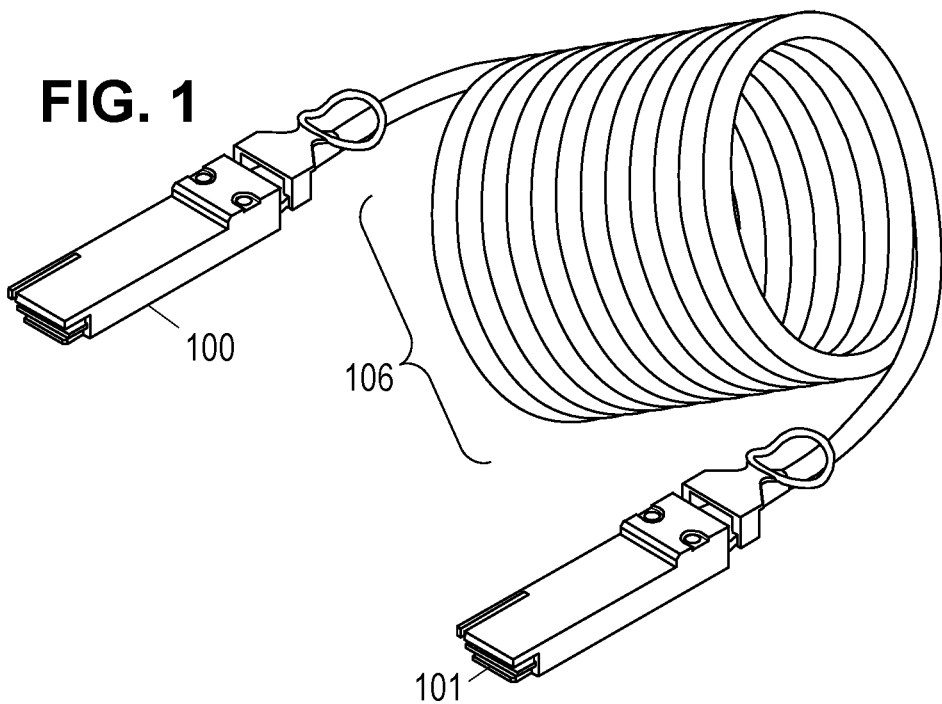
FIG. 1 is a perspective view of an illustrative active Ethernet cable (AEC).

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

FIG. 1 is a perspective view of an illustrative cable that may be used to provide a high-bandwidth communications link between devices in a routing network such as that used for data centers, server farms, and interconnection exchanges. The routing network may be part of, or may include, for example, the Internet, a wide area network, or a local area network. The linked devices may be computers, switches, routers, and the like. The cable includes a first connector 100 and a second connector 101 that are connected via electrical conductors 106 in a cord. The electrical conductors 106 may be individually and (optionally) collectively shielded, having grounded conductive sheaths like coaxial cables to reduce signal crosstalk. The electrical conductors are preferably driven with single-ended signals that each convey non-return-to-zero (NRZ) symbols at 50 Gbps or more. Depending on the performance criteria, it may be possible to employ other differential or single-ended conductor implementations.

Each conductor 106 preferably provides unidirectional transport of a single-ended signal. To support differential PAM4 signaling at the connector interfaces while employing single-ended NRZ signaling over the electrical conductors, each connector 100, 101 includes a powered transceiver that performs clock and data recovery (CDR) and re-modulation of data streams, hereafter called a data recovery and re-modulation (DRR) device. The DRR devices process data streams traveling in each direction. As explained below, this approach enables robust performance over even extended cable lengths (greater than, say, 3 m, 6 m, or 9 m), while limiting the number of electrical conductors employed.

Figure 2:
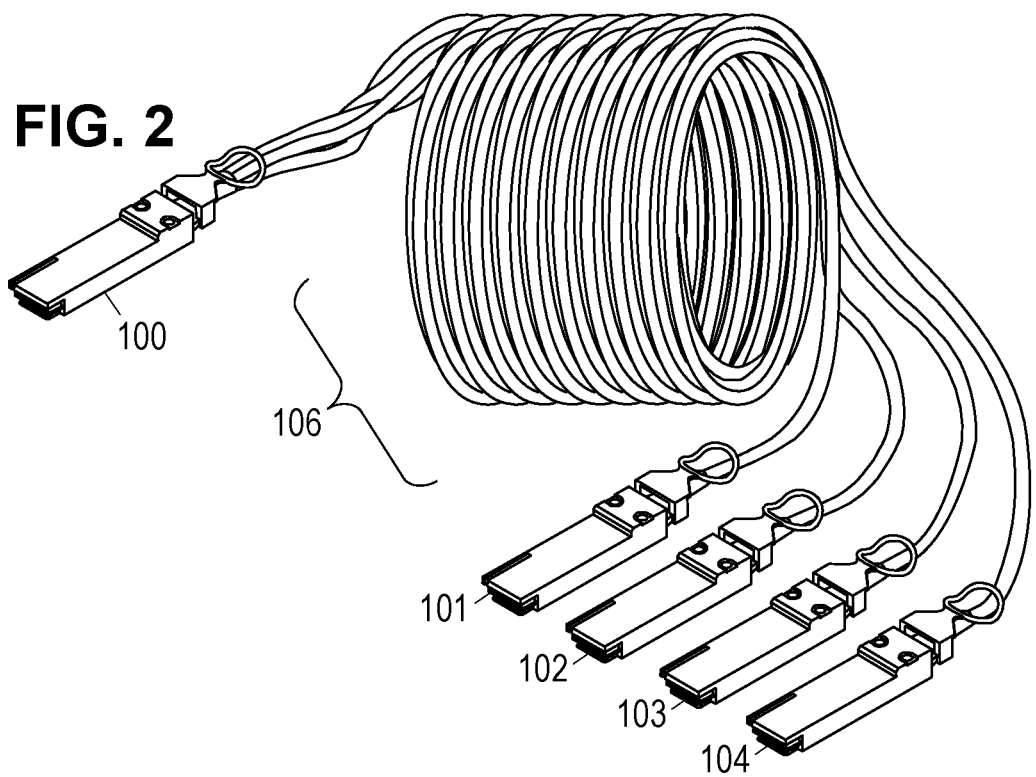
FIG. 2 is a perspective view of an illustrative 1:4 breakout AEC.

Though a 1:1 cable has been used in the foregoing description, the principles disclosed hereinbelow are also applicable to format conversion cables and to breakout cable designs. FIG. 2 is a perspective view of an illustrative 1:4 breakout cable having a unary end connector 100 which may be designed for sending and receiving an 800 Gbps Ethernet data stream, e.g., in the form of 8 lanes of 100 Gbps, each lane using PAM4 at 53.125 GBd. Electrical conductors 106 are encased as four cords each carrying 4 channels employing single-ended NRZ signaling at 53.125 GBd (50 Gbps) to (and from) a corresponding one of the split-end connectors 101-104. Each of the split-end connectors 101-104 may be designed for sending and receiving a 200 Gbps Ethernet data stream. Such breakout cables are useful for linking host devices designed to different generations of the Ethernet standard. At either the unary end or at the split ends (or both), the DRR devices may provide format conversion by, e.g., converting 1 lane of differential PAM4 symbols into 2 lanes of single-ended NRZ symbols, and vice versa.

Figure 3A:
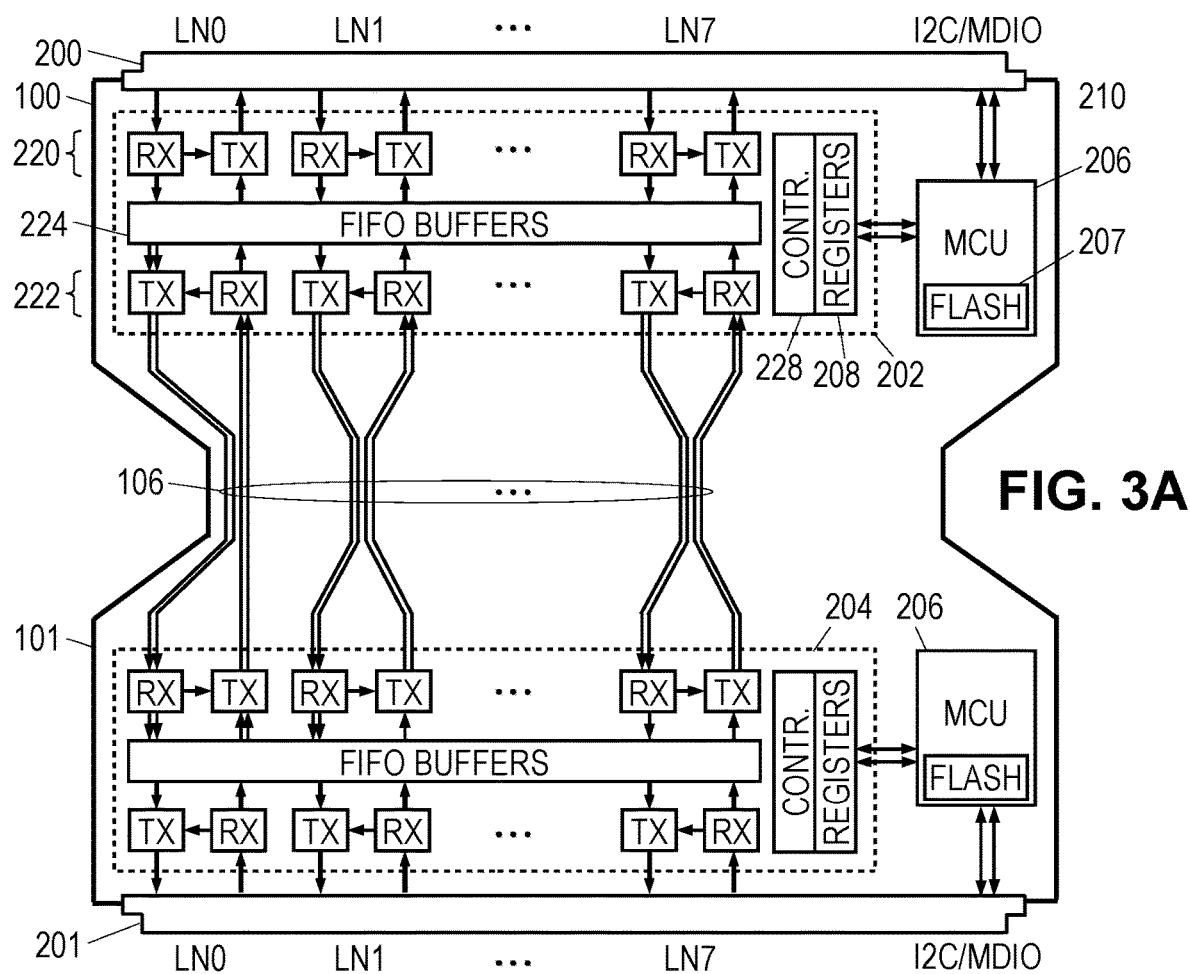
FIG. 3A is a function-block diagram of the illustrative AEC.

FIG. 3A is a function-block diagram of the illustrative cable of FIG. 1. Connector 100 includes a plug 200 adapted to fit a standard-compliant Ethernet port in a first host device 302 (see FIG. 3B) to receive an electrical input signal carrying an outbound data stream from the host device and to provide an electrical output signal carrying an inbound data stream to the host device. Similarly, connector 101 includes a plug 201 that fits an Ethernet port of a second host device 304. Connector 100 includes a first DRR device 202 to perform CDR and re-modulation of the data streams entering and exiting the cable at connector 100, and connector 101 includes a second DRR device 204 to perform CDR and re-modulation of the data streams entering and exiting the cable at connector 101. The DRR devices 202, 204 may be integrated circuits mounted on a printed circuit board and connected to connector plug pins via circuit board traces. The electrical conductors 106 and shields may be soldered to corresponding pads on the printed circuit board that electrically connect to the DRR devices.

In at least some contemplated embodiments, the printed circuit boards each also support a micro-controller unit (MCU) 206. Each DRR device 202, 204 is coupled to a respective MCU device 206 which configures the operation of the DRR device via a first two-wire bus. At power-on, the MCU device 206 loads equalization parameters from Flash memory 207 into the DRR device's configuration registers 208. The host device can access the MCU device 206 via a second two-wire bus that operates in accordance with the I2C bus protocol and/or the faster MDIO protocol. With this access to the MCU device 206, the host device can adjust the cable's operating parameters and monitor the cable's performance as discussed further below.

Each DRR device 202, 204, includes a set 220 of transmitters and receivers for communicating with the host device and a set 222 of transmitters and receivers for sending and receiving via conductor pairs running the length of the cable. The illustrated cable supports eight bidirectional communication lanes LN0-LN7, each bidirectional lane formed by two unidirectional connections, each unidirectional connection having two coaxial conductors 106 (with shield conductors not shown here) each carrying single-ended NRZ modulated signals. The transceivers optionally include a memory 224 to provide first-in first-out (FIFO) buffering between the transmitter & receiver sets 220, 222. An embedded controller 228 coordinates the operation of the transmitters and receivers by, e.g., setting initial equalization parameters and ensuring the training phase is complete across all lanes and links before enabling the transmitters and receiver to enter the data transfer phase. The embedded controller 228 employs a set of registers 208 to receive commands and parameter values, and to provide responses potentially including status information and performance data.

In at least some contemplated embodiments, the host-facing transmitter and receiver set 220 employ fixed equalization parameters that are cable-independent, i.e., they are not customized on a cable-by-cable basis. The center-facing transmitter and receiver set 222 preferably employ cable-dependent equalization parameters that are customized on a cable-by-cable basis. The cable-dependent equalization parameters may be adaptive or fixed, and initial values for these parameters may be determined during manufacturer tests of the cable. The equalization parameters may include filter coefficient values for pre-equalizer filters in the transmitters, and gain and filter coefficient values for the receivers.

The illustrative cable of FIG. 3A may be a part of a point-to-point communications link between two host devices 302, 304 as shown in the architectural diagram of FIG. 3B. FIG. 3B shows the architecture using the ISO/IEC Model for Open Systems Interconnection (See ISO/IEC 7498-1:1994.1) for communications over a physical medium such as the electrical conductors represented by channels 306. The interconnection reference model employs a hierarchy of layers with defined functions and interfaces to facilitate the design and implementation of compatible systems by different teams or vendors. While it is not a requirement, it is expected that the higher layers in the hierarchy will be implemented primarily by software or firmware operating on programmable processors while the lower layers may be implemented as application-specific hardware.

The Application Layer 308 is the uppermost layer in the model, and it represents the user applications or other software operating on different systems that need a facility for communicating messages or data. The Presentation Layer 310 provides such applications with a set of application programming interfaces (APIs) that provide formal syntax along with services for data transformations (e.g., compression), establishing communication sessions, connectionless communication mode, and negotiation to enable the application software to identify the available service options and select therefrom. The Session Layer 312 provides services for coordinating data exchange including: session synchronization, token management, full- or half-duplex mode implementation, and establishing, managing, and releasing a session connection. In connectionless mode, the Session Layer may merely map between session addresses and transport addresses.

The Transport Layer 314 provides services for multiplexing, end-to-end sequence control, error detection, segmenting, blocking, concatenation, flow control on individual connections (including suspend/resume), and implementing end-to-end service quality specifications. The focus of the Transport Layer 314 is end-to-end performance/behavior. The Network Layer 316 provides a routing service, determining the links used to make the end-to-end connection and when necessary acting as a relay service to couple together such links. The Data link layer 318 serves as the interface to physical connections, providing delimiting, synchronization, sequence and flow control across the physical connection. It may also detect and optionally correct errors that occur across the physical connection. The Physical layer 322 provides the mechanical, electrical, functional, and procedural means to activate, maintain, and deactivate channels 306, and to use the channels 306 for transmission of bits across the physical media.

The Data Link Layer 318 and Physical Layer 322 are subdivided and modified slightly by IEEE Std 802.3-2015, which provides a Media Access Control (MAC) Sublayer 320 in the Data Link Layer 318 to define the interface with the Physical Layer 322, including a frame structure and transfer syntax. Within the Physical Layer 322, the standard provides a variety of possible subdivisions such as the one illustrated in FIG. 3B, which includes an optional Reconciliation Sublayer 324, a Physical Coding Sublayer (PCS) 326, a Forward Error Correction (FEC) Sublayer 328, a Physical Media Attachment (PMA) Sublayer 330, a Physical Medium Dependent (PMD) Sublayer 332, and an Auto-Negotiation (AN) Sublayer 334.

The optional Reconciliation Sublayer 324 merely maps between interfaces defined for the MAC Sublayer 320 and the PCS Sublayer 326. The PCS Sublayer 326 provides scrambling/descrambling, data encoding/decoding (with a transmission code that enables clock recovery and bit error detection), block and symbol redistribution, PCS alignment marker insertion/removal, and block-level lane synchronization and deskew. To enable bit error rate estimation by components of the Physical Layer 322, the PCS alignment markers typically include Bit-Interleaved-Parity (BIP) values derived from the preceding bits in the lane up to and including the preceding PCS alignment marker.

The FEC Sublayer 328 provides, e.g., Reed-Solomon coding/decoding that distributes data blocks with controlled redundancy across the lanes to enable error correction. In some embodiments (e.g., in accordance with Article 91 or proposed Article 134 for the IEEE Std 802.3), the FEC Sublayer 328 modifies the number of lanes (Article 91 provides for a 20-to-4 lane conversion).

The PMA Sublayer 330 provides lane remapping, symbol encoding/decoding, framing, and octet/symbol synchronization. The PMD Sublayer 332 specifies the transceiver conversions between transmitted/received channel signals and the corresponding bit (or digital symbol) streams. An optional AN Sublayer 334 is shown as a internal element of the PMD Sublayer 332, and it implements an initial start-up of the communications channels, conducting an auto-negotiation phase and a link-training phase before entering a normal operating phase. The auto-negotiation phase enables the end nodes to exchange information about their capabilities, and the training phase enables the end nodes to adapt both transmit-side and receive-side equalization filters in a fashion that combats the channel non-idealities. A receptacle 336 is also shown as part of the PMD sublayer 332 to represent the physical network interface port.

The connectors 100, 101, have plugs 200, 201 that mate with the receptacles 336 of the two host devices 302, 304. Within each connector, the DRR devices may implement a host-facing Physical Layer 322A, a center-facing Physical Layer 322B, and a Data Link Layer 340 that bridges together the two Physical Layers. In some embodiments, one or more of the internal sublayers within each connector (e.g., FEC, PCS, Reconciliation, MAC) are bypassed or omitted entirely to reduce areal requirements and/or to reduce power. More information regarding the operation of the sublayers, as well as the electrical and physical specifications of the connections between the nodes and the communications medium (e.g., pin layouts, line impedances, signal voltages & timing), and the electrical and physical specifications for the communications medium itself (e.g., conductor arrangements in copper cable, limitations on attenuation, propagation delay, signal skew), can in many cases be found in the current Ethernet standard, and any such details should be considered to be well within the knowledge of those having ordinary skill in the art.

It should be noted that the use of single-ended 50 Gbps NRZ signaling is contemplated for conveying the transit data streams on electrical conductors 106, a signaling protocol that is not currently contemplated by the current Ethernet standard. Accordingly, the specifications set forth in Optical Internetworking Forum Contribution OIF2014.277.11 "CEI-56G-VSR-NRZ Very Short Reach Interface" may be employed as a basis for setting performance requirements of conductors 106 and the interfaces thereto.

As the bridge between the host-facing transceivers and the cable-facing transceivers, the Data Link layer 340 supports between the 100 Gbps datastreams conveyed by differential PAM4 signaling and the two corresponding 50 Gbps datastreams conveyed by single-ended NRZ signaling. In one contemplated embodiment, one of the 50 Gbps datastreams conveys the most significant bit (msb) of each PAM4 symbol while the other 50 Gbps datastream conveys the least significant bit (lsb).

Figure 3C:
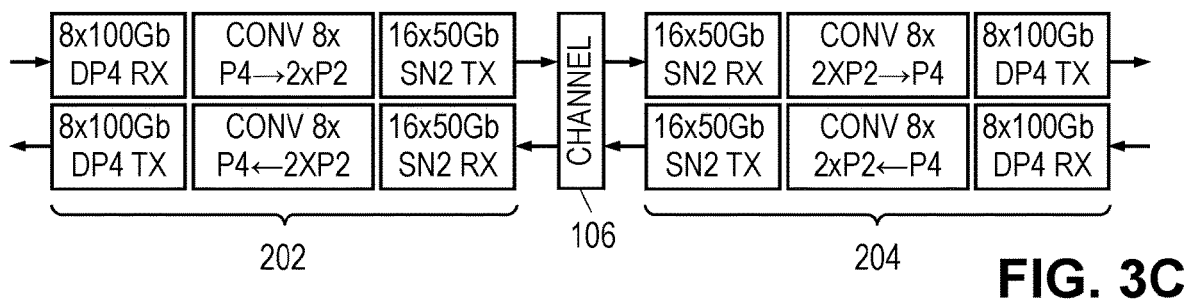
FIG. 3C is a block diagram of protocol conversions by the illustrative AEC.

FIG. 3C is a block diagram of the protocol conversions that may be provided by the DRR devices 202, 204 of the AEC. In each DRR device, the host-facing transceivers 220 include eight receivers accepting an outbound data stream from a host interface in the form of eight differential PAM4 modulated input signals, and eight transmitters providing an inbound data stream to the host interface in the form of eight differential PAM4 modulated output signals. The differential PAM4 signals are modulated at 53.125 GBd to convey 100 Gbps per lane. In each DRR device, the cable-facing transceivers 222 include sixteen transmitters for sending sixteen single-ended PAM2 (more commonly known as NRZ) modulated transit signals and sixteen receivers for receiving sixteen single-ended PAM2 modulated transit signals. The single-ended PAM2 signals are modulated at 53.125 GBs to convey 50 Gbps per lane.

FIG. 3C further shows the DRR devices 202, 204, as having eight PAM4 to 2xPAM2 converters and eight 2xPAM2 to PAM4 converters coupling the host-facing transceivers to the cable-facing transceivers. Though some contemplated DRR device implementations do include demultiplexers and multiplexers or other physical circuits to implement the conversion, it is expected that in practice the conversion can be implemented by suitable design of the FIFO buffers in memory 224 or, stated in another fashion, by suitable coordination of the write-read accesses to memory 224.

Figure 3D:
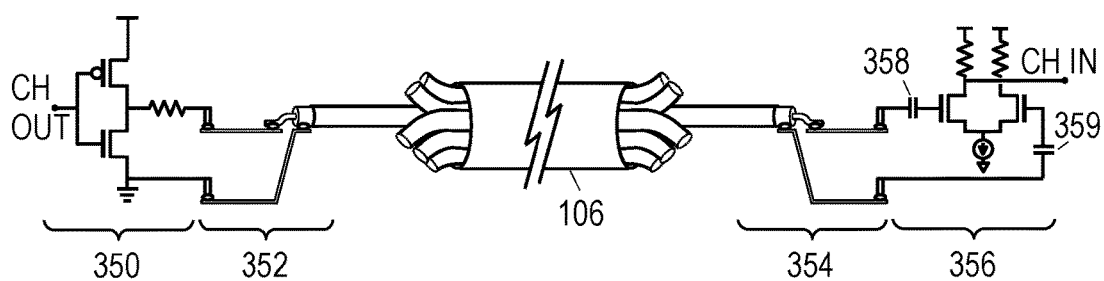
FIG. 3D is a schematic of an illustrative AEC conductor driver and receiver.

FIG. 3D shows an illustrative one of the conductors 106 connected between a single-ended NRZ driver 350 and a receive amplifier 356. Driver 350 is on-chip as part of, e.g., DRR device 202, and receive amplifier 356 is similarly on-chip as part of, e.g., DRR device 204. Conductors 352 and 354 schematically represent the connection of the on-chip components to the center conductor and shield of the illustrated coaxial wire via printed circuit board traces, bonding pads, and solder-attached chip pins or pads. Some contemplated embodiments employ a spring clip to electrically connect coaxial wire shield to the bonding pad of the ground connection on each end.

The illustrated driver 350 employs a CMOS inverter configuration driving the center conductor with the inverted version of the $CH_{OUT}$ signal. The illustrated receive amplifier 356 employs a differential transistor pair having one gate coupled to the center conductor and the other gate coupled to the shield. DC-blocking capacitors 358 and 359 may be provided to enable suitable biasing of the gates in the differential transistor pair. In addition to providing amplification of the received signal, the amplifier blocks any common mode signal that might be present on the wire. The illustrated receive amplifier 356 produces a $CH_{IN}$ signal that is an inverted version of the received signal.

We note here that a performance advantage may be achieved by using two 50 Gbps single-ended NRZ signals in place of each 100 Gbps differential PAM4 signal. For a given transmit signal voltage (relative to ground), the height of the differential PAM4 decision eye is only ⅔ that of single-ended NRZ, which translates into approximately a 3.5 dB penalty. At the contemplated signaling rates, insertion losses, and channel conditions, this penalty corresponds to at least four orders of magnitude difference in bit error rates (measured at ~2e-11 for differential PAM4 vs <1e-15 for single-ended NRZ).

Thus intersymbol interference is reduced with single-ended NRZ, offering significantly improved performance in terms of bit error rates at the cost of doubling the number of transmit drivers. Crosstalk may increase, though this typically exhibits as a common mode signal that can be blocked or minimized. The receive amplifier discussed previously offers one technique for blocking the common mode. Other techniques that can be alternatively or additionally employed include maintaining a common ground through the signal path and shielding the conductors carrying the transmit signal. Ground bounce is also recognized as a common issue for single-ended signaling, but the use of the common ground through the signal path minimizes this effect. Ground bounce can alternatively or additionally be addressed through the use of AC coupling (e.g., capacitors 358, 359).

Having discussed how the potential disadvantages of single-ended signaling can be addressed, we now discuss certain disadvantages of differential PAM4 signaling that are avoided when single-ended NRZ signaling is employed. Differential signaling requires minimization of skew between the positive and negative signals. At the signaling rates contemplated herein, differential skew minimization requires substantial design efforts indeed. PAM4 signaling commonly causes error propagation which typically necessitates more complex error correction coding modules. NRZ signaling avoids this issue, enabling the use of less complex error correcting codes and potentially offsetting the power consumption and areal requirements of the additional transmit drivers.

Figure 5:
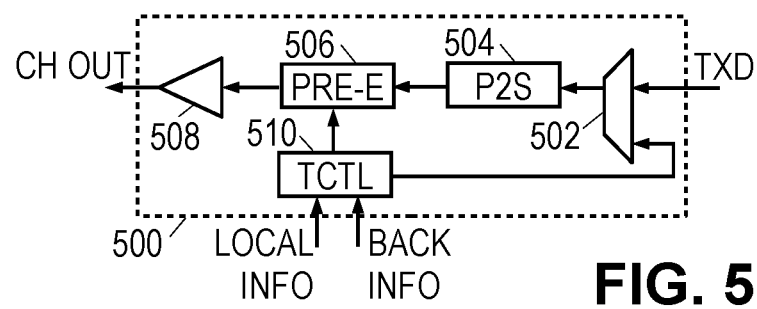
FIG. 5 is a block diagram of a transmitter in an illustrative multi-lane DRR device.
Figure 4:
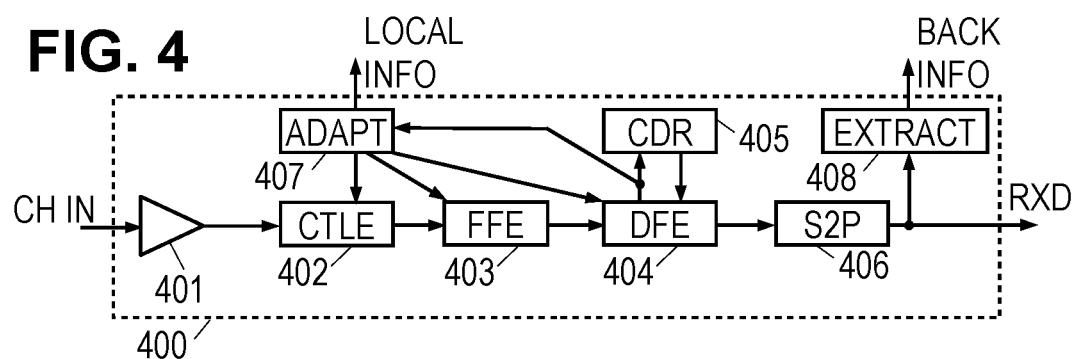
FIG. 4 is a block diagram of a receiver in an illustrative multi-lane data recovery and remodulation (DRR) device.

The MAC, Reconciliation, PCS, FEC, PMA, and PMD Sublayers, described above with reference to FIG. 3B, may be implemented as application-specific integrated circuitry to enable high-rate processing and data transmission. The receiver and transmitter sets 220, 222, may implement the PMA and PMD sublayers. FIGS. 4 and 5 are block diagrams of an illustrative receiver and an illustrative transmitter that may be members of the sets 220, 222.

In FIG. 4, receiver 400 receives an analog electrical signal (CH_IN) and supplies it to an optional low noise amplifier (LNA) 401. If included, the LNA 401 provides a high input impedance to minimize channel loading and amplifies the received electrical signal to drive the input of a continuous time linear equalization (CTLE) filter 402. CTLE filter 402 provides continuous time filtering to shape the signal spectrum to reduce the length of the channel impulse response while minimizing leading inter-symbol interference (151). A digital feed-forward equalization (FFE) filter 403 may be used to augment the performance of the CTLE filter 402. A decision feedback equalizer (DFE) 404 operates on the filtered signal to correct for trailing ISI and detect each transmitted channel bit or symbol, thereby producing a demodulated digital data stream. Some receiver embodiments employ oversampling in the FFE 403 and DFE 404. A clock and data recovery (CDR) circuit 405 extracts a clock signal from the filtered signal and/or the digital data stream and supplies it to DFE 404 to control sample and symbol detection timing. A serial-to-parallel circuit 406 groups the digital data stream bits or symbols into blocks to enable subsequent on-chip operations to use lower clock rates. The symbols or data blocks are placed on the digital receive bus (RXD) for remodulation and transmission by a transmitter to the remote end of the channel.

While certain contemplated cable embodiments do not support auto-negotiation, other contemplated embodiments do support auto-negotiation in accordance with the Ethernet standard. When supported, the auto-negotiation may be implemented as described in PCT/CN2017/075961, titled "Ethernet link extension method and device" by inventors Yifei Dai, Haoli Qian, and Jeff Twombly, and filed 2017 Mar. 8. A detector or packet information extractor 408 monitors the receive signal for the end of the auto-negotiation phase and/or the beginning of the training phase frames. Whether or not autonegotiation is supported, a training phase may be performed during the manufacturing process to set initial values of the equalization parameters for the completed cable.

During the training phase, a filter adaptation circuit 407 measures an error between the input and output of a decision element in DFE 404, employing that error in accordance with well-known techniques from the literature on adaptive filtering to determine adjustments for the coefficients in CTLE filter 402, FFE filter 403, DFE 404, and a transmit filter 506 (discussed further below), and to determine whether convergence has been achieved. The adaptation circuit 407 adjusts the coefficient values of elements 402-404 and outputs locally-generated information (LOCAL_INFO), which includes the transmit filter coefficient adjustments and the convergence status. Where the system supports the use of a backchannel, the LOCAL_INFO is supplied to a local transmitter 500 that communicates in the reverse direction on the data lane. The local transmitter communicates the transmit filter adjustments and the convergence status via the backchannel to the source of the CH_IN signal. In that vein, the received signal includes back-channel information from the source of the CH_IN signal. A packet information extractor 408 detects the back-channel information (BACK_INFO) and passes it to the local transmitter 500. In the absence of a back-channel, the LOCAL_INFO may be communicated via the host-interface to the testing apparatus as discussed further below. Once convergence is achieved, receiver 400 is ready to begin normal operations.

In FIG. 5, transmitter 500 receives blocks of channel bits or symbols for transmission to the source of the CH_IN signal (FIG. 4). During normal operations, multiplexer 502 supplies blocks of channel bits or symbols from the remote source (received on the TXD bus) to the parallel to serial (P2S) circuit 504. P2S circuit converts the blocks into a digital data stream. A transmit filter 506, also called a pre-equalization filter, converts the digital data stream into an analog electrical signal with spectral shaping to combat channel degradation. Driver 508 amplifies the analog electrical signal to drive the channel output (CH_OUT) node.

The current IEEE standard provides for up to four taps in the transmit filter, but at least some contemplated cable embodiments employ up to 30 or more taps in the transmit filter. This "long-tap" filter provides sufficient equalization for the receiver to minimize, or even eliminate, the FFE filter and achieve a significant power savings.

If supported, the auto-negotiation phase may be implemented as set forth in Y. Dai et al. During the training phase, multiplexer 502 obstructs information from the TXD bus, instead supplying P2S circuit 504 with training frames from a training controller 510. The training controller 510 generates the training frames based on the convergence status and transmit filter coefficient adjustments (LOCAL_INFO) received from the local receiver 400. That is, in addition to training patterns, the training frames may include backchannel information to be used by the remote end of the channel. Note that even after the local receiver indicates filter convergence has occurred, the training controller 510 may prolong the training phase to coordinate training phase timing across lanes and along each link of the channel. The training frames include training sequences as specified by the relevant portions of the current Ethernet standard (IEEE Std 802.3).

The training controller 510 further accepts any back-channel information (BACK_INFO) extracted by the local receiver 400 from received training frames sent by the local end node. The training controller applies the corresponding adjustments to the coefficients of transmit filter 506. Upon conclusion of the training phase, multiplexer 502 begins forwarding TxD blocks to the P2S circuit 504.

Within the foregoing context of an illustrative implementation, we now return to the block diagram of FIG. 3A. The connector 200, DRR device 202, MCU device 206, and dual channel bypass switch 210, may be mounted to a paddle card, i.e., a printed circuit card encased in the connector body. The connector 200 may be a pluggable module compliant with any one of the pluggable module standards, e.g., SFP, SFP-DD, QSFP, QSFP-DD, OSFP. Most of these standards include a two-wire interface (typically an I2C bus) that enables the host to monitor, debug, or control the pluggable module via the host interface. The two-wire interface protocol is a master-slave protocol, with the host expected to be the bus master and the module expected to be the slave. The MCU device 206 operates as an I2C bus slave to communicate with the I2C bus master on the host side.

The MCU device 206 relies on bootup code and firmware stored in the embedded flash memory 207 to handle the power-on process and coordinate the operations of the other paddle card components, including the DRR device and power management chip (not shown). The DRR device itself includes an embedded controller 228 that coordinates operation of the other on-chip components, among other things providing lane control and adaptation of filter coefficients in the receivers. The embedded controller 228 accesses the registers 208 via a high speed internal bus, while the MCU device 206 accesses them via a two-wire interface such as the I2C bus or an MDIO interface protocol. The embedded controller 228 and the MCU device 206 can accordingly exchange data by reading and writing the register fields.

For developing and debugging the operation of the cable electronics, it is desirable for the host to have access to all of the SerDes parameters, including the coefficients of the transmit and receive filters, the noise and error statistics (including equalization error, timing error, symbol error rates, and packet loss rates), link event logs, and buffer contents, for each host-facing and center-facing interface lane of the DRR device.

FIG. 6 shows an illustrative cable manufacturing method. It begins in block 602 with electrically connecting the ends of the conductor pairs in the cable cord to the paddle cards, and more specifically, to the center-facing interfaces of the first and second DRR devices. The connecting may be done by automated equipment soldering the wire ends to pads on the paddle cards on which the DRR devices are mounted. In block 604, the equipment packages each paddle card in a respective end connector for the network cable. As previously mentioned, the end connectors may be, e.g., SFP, SFP-DD, QSFP, QSFP-DD, or OSFP pluggable modules. The end connectors are adapted to mate with network interface ports of host devices, and include plugs that electrically connect with matching receptacles in the ports.

In block 605, the equipment configures the operation of the DRR devices by, e.g., loading firmware to the nonvolatile memory. Among other things, the DRR devices may be configured to communicate using 100 Gbps differential PAM4 signaling on their host-facing transceivers and to communicate using 50 Gbps single-ended NRZ signaling on their cable-facing transceivers, with suitable conversion between the two signaling protocols as described previously.

In block 606, the equipment tests the cable to verify compliance with performance specifications and to determine cable-dependent equalization parameters for use by the center-facing transmitter and receiver sets 222. The testing is performed by plugging each cable's end connectors into corresponding ports of automated testing equipment (ATE). As the connectors receive power, the MCU chip retrieves firmware code for itself from nonvolatile memory such as an internal flash memory, executing it to coordinate the bootup and operation of the other connector components. The internal flash memory may further include firmware for the embedded controller of the DRR device, and if so, the MCU chip conveys the firmware to the embedded controller via a two wire bus such as I2C or MDIO. In some contemplated embodiments, the two wire bus supports both the I2C protocol and the faster MDIO protocol, and the DRR device switches from one protocol to the other on demand. Once the firmware has been loaded, the MCU chip instructs the embedded controller to execute the firmware. Once both the MCU chip and DRR device are both working, the end connector operates as previously described above.

Channel estimation and equalization are key elements of high bandwidth communication. While the host-facing transmitters and receivers may only need to contend with negligible signal distortion, the center-facing transmitters and receivers will generally have to accommodate severe signal attenuation and distortion. As described with reference to FIG. 4, the equalization may be performed in the receivers using a combination of CTLE, FFE, and DFE elements. While such equalization is very effective, channels with severe signal distortion may require the use of many filter taps (and coefficients) in the FFE filter and DFE feedback filter, leading to prohibitive levels of power consumption and dissipation. The use of a transmitter equalization filter (aka pre-equalization, pre-distortion, or pre-shaping) enables the use of far fewer taps in the receive filters, potentially enabling the FFE filter to be omitted entirely. While additional filter taps are implemented in the transmitter, the net result is that a substantial reduction in the power consumption level is achieved due to a number of factors including avoidance of the noise enhancement often associated with receiver-side equalization and digital filtering with a reduced bit-width.

In block 606, the DRR devices set their transmit and receive filter coefficients to initial default values. As the communications link is established, the center-facing transmitters and receivers may optionally engage in a training phase to adapt the filter coefficient values. Alternatively, or in addition, the automated testing equipment may begin sending and receiving a training pattern such as, e.g., a pseudo-random binary sequence (PRBS), enabling optional adaptation of the filter coefficients. As yet another alternative or addition, the filter coefficient values may be maintained while the automated test equipment correlates collected error measurements to the training patterns to estimate residual intersymbol interference (ISO. Such residual ISI estimates can be combined with knowledge of the filter coefficient settings to determine, directly or iteratively, the optimum transmit and receive filter coefficient values.

In block 608, the automated tester equipment "burns" the flash memory or otherwise programs the initial default values of the filter coefficients to be the optimum values identified in block 606. The communication between the DRR devices and the ATE to, e.g., collect channel estimation information and refine the default coefficient values, occurs via a two wire interface built in to the pins of the connector plug. Preferably the two wire interface supports the well known I2C protocol for maximum acceptance. However, the I2C protocol may be limited to a maximum clock rate of 1 MHz, limiting the bandwidth of the information collection process and prolonging the time required for the ATE to determine and program the optimum filter coefficient values. Accordingly, at least some contemplated embodiments also support the use of the MDIO interface protocol which can employ clock rates up to at least 10 MHz, significantly reducing the time required by the ATE. The ATE may establish initial communication with the MCU chip using the I2C protocol, then the ATE and the MCU chip may coordinate a dynamic switch to the faster MDIO protocol for the duration of the channel characterization and firmware programming. The two-wire interface enables the ATE to communication with the MCU chip, and optionally relies on the MCU chip to access the DRR device registers.

Once the filter coefficient values have been programmed, the cable manufacturing process is nominally complete. In practice, however, it is desired to verify the proper operation of the cable and, in the event any failures are detected, it is desirable to debug the potential causes of the failure. Accordingly, the illustrated method includes block 610, in which the cable is manually or electrically "unplugged" and "re-plugged" into the same or different receptacles to reboot the cable hardware. As part of the reboot, the filter coefficients are set to their default values from the flash memory. The ATE applies a test data sequence to the cable to verify proper operation. If no errors are detected, such as e.g., inadequate signal margins, excessive symbol error rates, lost packets, or link failures, the cable operation is verified and the process completes. The cable may then be packaged and sold to customers expecting robust performance.

On the other hand, if errors are detected at this point, or optionally if they are later detected in the field, the ATE or host may trigger a debug dump in block 612. The ATE or host uses the two-wire bus to write a register in the MCU chip to initiate the debug dump. After receiving the dump command, the MCU chip may trigger an interrupt of the embedded controller by writing the associated register in the DRR device. The interrupt causes the embedded controller to capture all the serdes parameters in memory. The serdes parameters may include, e.g., link status, frequency offset, signal margin (aka eye height).

As the memory in the DRR device is primarily volatile memory (SRAM), the DRR device in block 614 writes the captured information word by word to the registers, enabling the MCU chip to read and store the information in nonvolatile memory (flash). If the latter option is used in the field by a host lacking the facilities for parsing and analyzing the debug dump, the cable can later be plugged into automated test equipment that retrieves the captured information from the nonvolatile memory.

In block 616, the ATE provides the captured information to a computer that enables engineers to analyze the debug dump to identify the cause(s) of the failures. With knowledge of the causes, engineers can correct the vulnerabilities by re-training the filters, by updating the firmware, and/or by adjusting the hardware design.

Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. An active Ethernet cable that comprises:
   electrical conductors connected between a first connector and a second connector,
   each of the first and second connectors being adapted to fit into an Ethernet port of a corresponding host device to receive an electrical input signal to the cable conveying an outbound data stream from that host device and to provide an electrical output signal from the cable conveying an inbound data stream to that host device, said electrical input and output signals employing differential 4-level pulse amplitude modulation ("PAM4") to convey the inbound and outbound data streams,
   each of the first and second connectors including a respective transceiver that performs clock and data recovery on the electrical input signal to extract and re-modulate the outbound data stream for transit via the electrical conductors as respective pairs of electrical transit signal conveying a transit data stream, each of said respective pairs of electrical transit signals employing single-ended non-return-to-zero ("NRZ") modulation to convey the transit data streams.

2. The active Ethernet cable of claim 1, wherein the respective transceiver for each of the first and second connectors performs clock and data recovery on the respective pair of electrical transit signals to extract and re-modulate the transit data stream as the inbound data stream from the cable, each of the respective transceivers employing fixed, cable-independent, equalization parameters for each of: the remodulation of the transit data stream as the inbound data stream, and the clock and data recovery performed on the electrical input signal.

3. The active Ethernet cable of claim 2, wherein the respective transceivers each employ cable-dependent equalization parameters for at least one of: the remodulation of the outbound data stream for transit, and the clock and data recovery performed on the electrical transit signal.

4. The active Ethernet cable of claim 3, wherein said cable-dependent equalization parameters adapt during usage of the Ethernet cable.

5. The active Ethernet cable of claim 3, wherein said cable-dependent equalization parameters are fixed during normal usage of the Ethernet cable, and wherein said cable-dependent equalization parameters are determined during manufacturer-testing of the Ethernet cable.

6. The active Ethernet cable of claim 5, wherein the outbound data stream and the inbound data stream each have a per-lane symbol rate in excess of 50 GBd, while each said electrical conductor conveys NRZ bit symbols at a rate in excess of 50 Gbps.

7. The active Ethernet cable of claim 1, wherein the electrical conductors convey 16 electrical transit signals from the first connector to the second connector and another 16 electrical transit signals from the second connector to the first connector, thereby conveying data in each direction at a rate in excess of 800 Gbps.

8. A communication method that comprises, in a network cable having electrical conductors connecting a first connector to a second connector:
   receiving with the first connector a first electrical input signal using differential 4-level pulse amplitude modulation ("PAM4") to convey a first outbound data stream from a first host device;
   performing clock and data recovery on the first electrical input signal with a first transceiver in the first connector to extract the first outbound data stream;
   re-modulating the first outbound data stream as a first pair of electrical transit signals using single-ended non-return-to-zero ("NRZ") modulation to convey a first transit data stream;
   receiving with the second connector a second electrical input signal using differential PAM4 modulation to convey a second outbound data stream from a second host device;
   performing clock and data recovery on the second electrical input signal with a second transceiver in the second connector to extract the second outbound data stream; and
   re-modulating the second outbound data stream as a second pair of electrical transit signals using single-ended NRZ modulation to convey a second transit data stream.

9. The communication method of claim 8, further comprising:
   performing clock and data recovery on the first pair of electrical transit signals with the second transceiver to extract the first transit data stream;
   re-modulating the first transit data stream as a second electrical output signal using differential PAM4 to convey a second inbound data stream to the second host device;
   performing clock and data recovery on the second pair of electrical transit signals with the first transceiver to extract the second transit data stream; and re-modulating the second transit data stream as a first electrical output signal using differential PAM4 to convey a first inbound data stream to the first host device.

10. The communication method of claim 9, wherein said re-modulating the first transit data stream, said re-modulating the second transit data stream, said performing clock and data recovery on the first electrical input signal, and said performing clock and data recovery on the second electrical input signal, each employ fixed, cable-independent, equalization parameters.

11. The communication method of claim 10, wherein cable-dependent equalization parameters are employed for at least one of: re-modulating the first outbound data stream, re-modulating the second outbound data stream, said performing clock and data recovery on the first electrical transit signal, and said performing clock and data recovery on the second electrical transit signal.

12. The communication method of claim 11, wherein said cable-dependent equalization parameters are adaptively updated.

13. The communication method of claim 11, wherein said cable-dependent equalization parameters are fixed during normal usage, and wherein the method further comprises: determining said cable-dependent equalization parameters during manufacturer-testing of the network cable.

14. The communication method of claim 13, wherein the first outbound data stream has a per-lane symbol rate in excess of 50 GBd.

15. A cable manufacturing method that comprises:
connecting a first end and a second end of a set of conductors to a first transceiver and a second transceiver, respectively, to transport a first pair of electrical transit signals from the first transceiver to the second transceiver and a second pair of electrical transit signals from the second transceiver to the first transceiver, the first and second pairs of electrical transit signals each using single-ended non-return-to-zero ("NRZ") modulation to convey data;
packaging the first transceiver into a first connector configured to couple a first electrical input signal from a network interface port of a first host device to the first transceiver and a first electrical output signal from the first transceiver to the network interface port of the first host device, the first electrical input and output signals each using differential 4-level pulse amplitude modulation ("PAM4") to convey data; and
packaging the second transceiver into a second connector configured to couple a second electrical input signal from a network interface port of a second host device to the second transceiver and a second electrical output signal from the second transceiver to the network interface port of the second host device, the second electrical input and output signals each using differential PAM4 to convey data,
the first and second transceivers being configured to perform clock and data recovery on the first and second electrical input signal to extract and re-modulate the first and second outbound data streams respectively as the first and second pairs of electrical transit signals conveying first and second transit data streams.

16. The cable manufacturing method of claim 15, wherein the first and second transceivers are configured to perform clock and data recovery on the second and first pairs of electrical transit signals to extract and re-modulate the second and first transit data streams as first and second inbound data streams conveyed by the first and second electrical output signals from the cable, and wherein the first and second transceivers are each configured to employ fixed, cable-independent, equalization parameters for clock and data recovery on the respective electrical input signals and for generating the respective electrical output signals.

17. The cable manufacturing method of claim 16, wherein the first and second transceivers are each configured to employ cable-dependent equalization parameters for generating the first and second pairs of electrical transit signals and for clock and data recovery on the second and first pairs of electrical transit signals.

18. The cable manufacturing method of claim 17, wherein the first and second transceivers are each configured to adapt the cable-dependent equalization parameters during operation.

19. The cable manufacturing method of claim 17, wherein the first and second transceivers are each configured to use preset cable-dependent equalization parameters during operation, and wherein the method further comprises: testing an assembled cable to determine the cable-dependent equalization parameters.

* * * * *